(12) United States Patent
Cheng

(10) Patent No.: US 11,055,510 B1
(45) Date of Patent: Jul. 6, 2021

(54) DISPLAY PANEL AND CONTROL METHOD THEREOF

(71) Applicant: BEIJING XIAOMI MOBILE SOFTWARE CO., LTD., Beijing (CN)

(72) Inventor: Chihjen Cheng, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 16/988,569

(22) Filed: Aug. 7, 2020

(30) Foreign Application Priority Data

Mar. 9, 2020 (CN) .......................... 202010157678.6

(51) Int. Cl.
  *G06K 9/00* (2006.01)
  *G06K 9/20* (2006.01)

(52) U.S. Cl.
  CPC ........... *G06K 9/0004* (2013.01); *G06K 9/209* (2013.01)

(58) Field of Classification Search
  CPC .................. G06K 9/0004; G06K 9/209; H01L 27/14643; H01L 27/14609; H01L 27/14806; G06F 3/042; G06F 3/0412; G09G 3/3648; G09G 2360/142; H04N 5/335; H04N 3/1525
  See application file for complete search history.

(56) References Cited

U.S. PATENT DOCUMENTS

| | | | | |
|---|---|---|---|---|
| 2010/0091162 | A1* | 4/2010 | Chuang | H04N 5/374 348/308 |
| 2010/0231562 | A1* | 9/2010 | Brown | H01L 27/14643 345/207 |
| 2013/0162602 | A1* | 6/2013 | Nakagawa | H01L 27/14601 345/175 |
| 2016/0148036 | A1* | 5/2016 | Kim | G06K 9/00046 382/124 |
| 2017/0006245 | A1* | 1/2017 | Akhavan Fomani | G06K 9/0002 |

* cited by examiner

*Primary Examiner* — Abhishek Sarma
(74) *Attorney, Agent, or Firm* — Syncoda LLC; Feng Ma

(57) ABSTRACT

A display panel includes a control module, and an active pixel sensor array connected to the control module. The active pixel sensor array includes multiple pixel circuits arranged in multiple rows. The pixel circuit includes: a photoelectric conversion module, a signal output terminal, a voltage control terminal, a gating module, and a pre-discharging module. The control module is configured to control the gating module in a current row to turn on, read a voltage signal outputted from the signal output terminal in the current row, generate a reference voltage signal according to the voltage signal, before the gating module in a next row is turned on, output the reference voltage signal to the voltage control terminal in the next row, and control the pre-discharging module in the next row to turn on.

20 Claims, 7 Drawing Sheets

DISPLAY PANEL AND CONTROL METHOD THEREOF

CROSS REFERENCE TO RELATED APPLICATION

This application claims priority to Chinese Patent Application No. 202010157678.6, filed on Mar. 9, 2020, the disclosure of which is hereby incorporated by reference in its entirety

BACKGROUND

With rapid development of display technologies, full-screen displays are increasingly favored by users. In order to meet the need of the users, various manufacturers have proposed a variety of solutions to increase a screen-to-body ratio. For example, a fingerprint detection module may be placed below a display screen to implement below-screen fingerprint technology. The fingerprint detection module may usually emit light and receive light reflected by a finger, and obtain a photoelectric-converted voltage signal through a photoelectric conversion module of an active pixel sensor array, to realize detection of a fingerprint.

SUMMARY

Various embodiments of the present disclosure provide an improved display panel and a control method thereof.

In a first aspect of the present disclosure, a display panel is provided. The display panel includes a control module and an active pixel sensor array connected to the control module, where the active pixel sensor array includes a plurality of pixel circuits arranged in a multi-row layout.

The pixel circuit includes: a photoelectric conversion module, a signal output terminal, and a voltage control terminal, a gating module configured to connect to the photoelectric conversion module and the signal output terminal, and a pre-discharging module including a first end and a second end, the first end being configured to connect between the photoelectric conversion module and the gating module, and the second end being configured to connect to the voltage control terminal. The control module is configured to, control the gating module in a current row to turn on, read a voltage signal outputted from the signal output terminal in the current row, generate a reference voltage signal according to the voltage signal, and before the gating module in a next row is turned on, output the reference voltage signal to the voltage control terminal in the next row and control the pre-discharging module in the next row to turn on.

In a second aspect of the present disclosure, a control method of a display panel is provided. The control method is configured to control the display panel, the display panel includes an active pixel sensor array, the active pixel sensor array includes a plurality of pixel circuits arranged in a multi-row layout, the pixel circuit includes a photoelectric conversion module, a signal output terminal, a voltage control terminal, a gating module connected to the photoelectric conversion module and the signal output terminal, and a pre-discharging module. The pre-discharging module includes a first end and a second end, the first end is connected between the photoelectric conversion module and the gating module, and the second end is connected to the voltage control terminal, the control method includes: controlling the gating module in a current row to turn on; reading a voltage signal outputted from the signal output terminal in the current row, and generating a reference voltage signal according to the voltage signal; before the gating module in a next row is turned on, outputting the reference voltage signal to the voltage control terminal in the next row and controlling the pre-discharging module in the next row to turn on.

In a third aspect of the present disclosure, a computer readable storage medium is provided. The computer readable storage medium has a program stored thereon, when the program is executed by a processor, a control method of a display panel is implemented, wherein the control method is configured to control the display panel, the display panel includes an active pixel sensor array, the active pixel sensor array includes a plurality of pixel circuits arranged in a multi-row layout, the pixel circuit includes a photoelectric conversion module, a signal output terminal, a voltage control terminal, a gating module connected to the photoelectric conversion module and the signal output terminal, and a pre-discharging module, the pre-discharging module comprising a first end and a second end, wherein the first end is connected between the photoelectric conversion module and the gating module, and the second end is connected to the voltage control terminal; wherein the control method includes: controlling the gating module in a current row to turn on; reading a voltage signal outputted from the signal output terminal in the current row; generating a reference voltage signal according to the voltage signal; and before the gating module in a next row is turned on, outputting the reference voltage signal to the voltage control terminal in the next row and controlling the pre-discharging module in the next row to turn on.

It should be understood that above general description and following detailed description are only exemplary and explanatory, but do not limit the present disclosure.

DETAILED DESCRIPTION

Descriptions will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of devices and methods consistent with aspects related to the disclosure as recited in the appended claims.

Terms used in the present disclosure are merely for a purpose of describing specific embodiments, but are not to limit the present disclosure. Unless otherwise defined, technical terms or scientific terms used in the present disclosure shall have common meanings understood by those with general skills in the field to which the present disclosure belongs. The terms "first," "second" and similar words used in the description and claims of the present disclosure do not indicate any order, quantity or importance, but are only used to distinguish different components. Similarly, "a" or "one" and similar words do not indicate a limit of quantity, but indicate that there is at least one. Unless otherwise indicated, "include" or "comprise" and similar words mean that elements or objects before "include" or "comprise" cover the elements or objects and their equivalents listed after "include" or "comprise," and other elements or objects are not excluded. "Connected" or "joined" and similar words are not limited to physical or mechanical connections, and may include electrical connections, whether direct or indirect.

The singular forms "a," "said" and "the" in the description and claims of the present disclosure are also intended to include the majority form unless the context clearly indicates other meanings. It should also be understood that the term "and/or" used herein refers to and comprises any or all possible combinations of one or more associated listed items.

Figure 1:
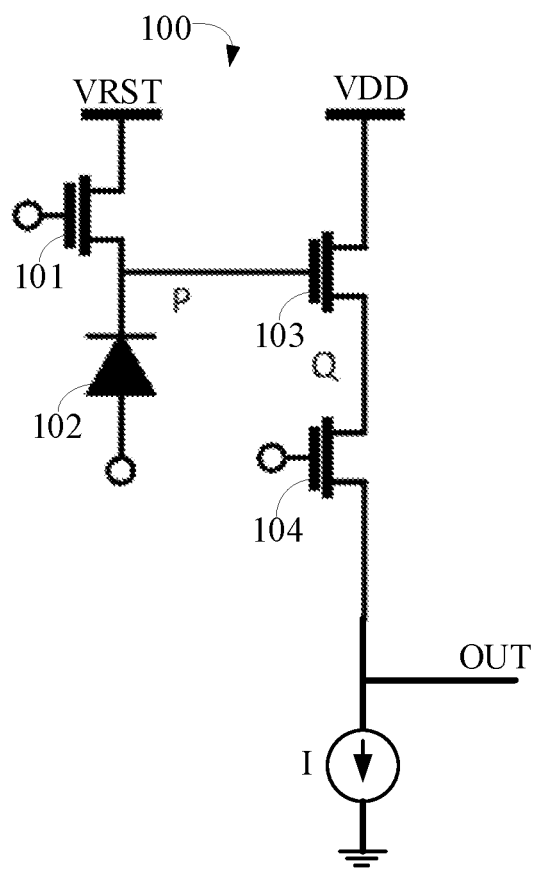
FIG. 1 is a schematic diagram illustrating a pixel circuit according to some embodiments.

In some embodiments, the display panel includes an active pixel sensor array, through which light reflected by fingerprint is received to detect the fingerprint. The active pixel sensor array includes a plurality of pixel circuits arranged in a multi-row layout. FIG. 1 is a schematic diagram illustrating a pixel circuit according to some embodiments. The pixel circuit 100 includes a reset module 101, a photoelectric conversion module 102, a source follower 103, and a gating module 104. The photoelectric conversion module 102 is used to convert a detected optical signal into a voltage signal, and a voltage signal photoelectrically converted by the photoelectric conversion module 102 may be obtained by detecting the voltage signal at point P between the reset module 101 and the photoelectric conversion module 102. By determining the voltage signal photoelectrically converted by the photoelectric conversion module 102 of the pixel circuit in each row, the fingerprint may be detected.

Specifically, when the pixel circuit 100 operates, the reset module 101 and the gating module 104 may be simultaneously turned on. The reset module 101 may reset the photoelectric conversion module 102, and a loop between the photoelectric conversion module 102, the source follower 103 and the gating module 104 is established through a current I. At this time, the voltage at any point Q between the source follower 103 and the gating module 104 may be regarded as the voltage of the signal output terminal OUT. The voltage V1 at the point P may be determined, according to a preset voltage relationship between the source follower 103 for the points P and Q, and the voltage at the point Q.

Figure 2:
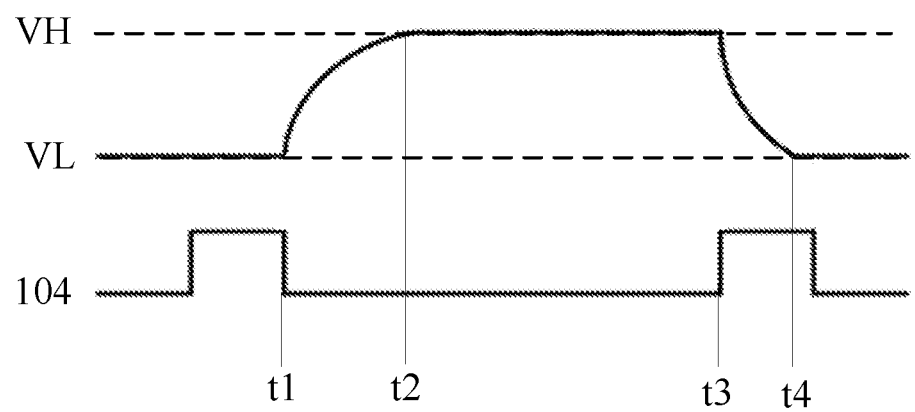
FIG. 2 is a schematic diagram illustrating a relationship between a voltage change at point Q in FIG. 1 and a working state of the gating module.

FIG. 2 is a schematic diagram illustrating a relationship between a voltage change at point Q in FIG. 1 and a working state of the gating module 104. As illustrated in FIG. 2, at time t1, the reset module 101 and the gating module 104 are turned off. At this time, the photoelectric conversion module 102 starts to accumulate optical signals and converts them into voltage signals. At time t3, the gating module 104 is controlled to turn on, and the loop between the photoelectric conversion module 102, the source follower 103, and the gating module 104 is established again by the current I. At this time, the voltage at the point Q may be obtained again, and the voltage V2 at the point P is further determined according to a preset voltage relationship between the point P and the point Q and the voltage at the point Q, and the voltage signal photoelectrically converted by the photoelectric conversion module 102 may be obtained according to a difference between the voltage V1 and the voltage V2.

However, in a time period during which the gating module 104 is in a turn-off state, that is, the time period from time t1 to time t3, because the gating module 104 is turned off, the voltage at the point Q may be pulled higher by the voltage terminal VDD, or even be pulled up to voltage VH, which is equal to a voltage at the voltage terminal VDD. When the gating module 104 is turned on at the time t3, the loop is turned on, and the voltage at the point Q returns to a stable state, the voltage at the point Q, that is, the voltage of the signal output terminal OUT is read at the time t4. It can be understood that when the voltage at the point Q falls from VH to the stable state VL, it takes a time period of t4−t3, which may delay a collection time of the voltage at the point Q. Especially for the active pixel sensor array, the collection time of the voltage signal in each row is delayed by the time period of t4−t3, which will increase the reading time of the voltage signals of the entire active pixel sensor array.

Figure 3:
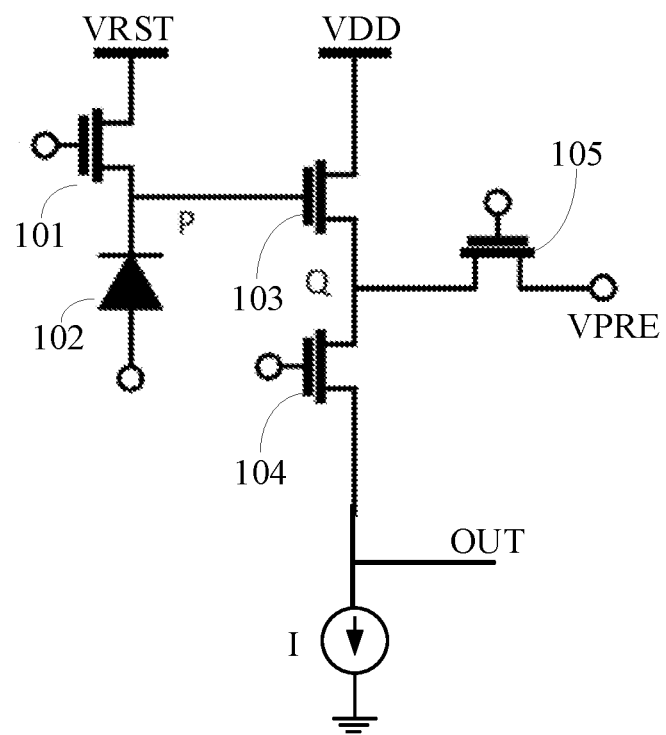
FIG. 3 is a schematic diagram illustrating a pixel circuit according to some embodiments.

In other embodiments, FIG. 3 is a schematic diagram illustrating a pixel circuit according to some embodiments. Compared to FIG. 1, a pre-discharging module 105 is added in FIG. 3, one end of the pre-discharging module 105 is connected between the source follower 103 and the gating module 104, and the pre-discharging module 105 is connected to the control module through a voltage control terminal VPRE. The control module controls the pre-discharging module 105 to turn on, and applies a preset voltage to the voltage control terminal VPRE, such that the voltage at the point Q may be pulled down, may be quickly changed from VH to VL and be stabilized at VL, and then output by the signal output terminal OUT. However, when detecting fingerprint, due to the different pressing areas of the finger on the pixel circuits in different rows and the valley and ridge structure of the fingerprint, the optical signals accumulated by the photoelectric conversion module 102 of the pixel circuits in different rows are different, which makes the voltages at the point P of the pixel circuits in different rows different, and then causes the voltages at the point Q to be different. That is, the voltages at the point Q of the pixel circuits in different rows cannot be estimated. In this way, although the pre-discharging module 105 may play an act of stabilizing the voltage at the point Q, when the preset voltage applied to the voltage control terminal VPRE differs greatly from the voltage at the point Q, additional coupling noises may be still caused, which is not conducive to improving the readout efficiency of the voltage signal.

In order to solve the above problems, embodiments of the present disclosure provide a display panel and a control method thereof, and an electronic device. A detailed explanation is performed in combination with FIG. 4 to FIG. 10 as follows.

Figure 4:
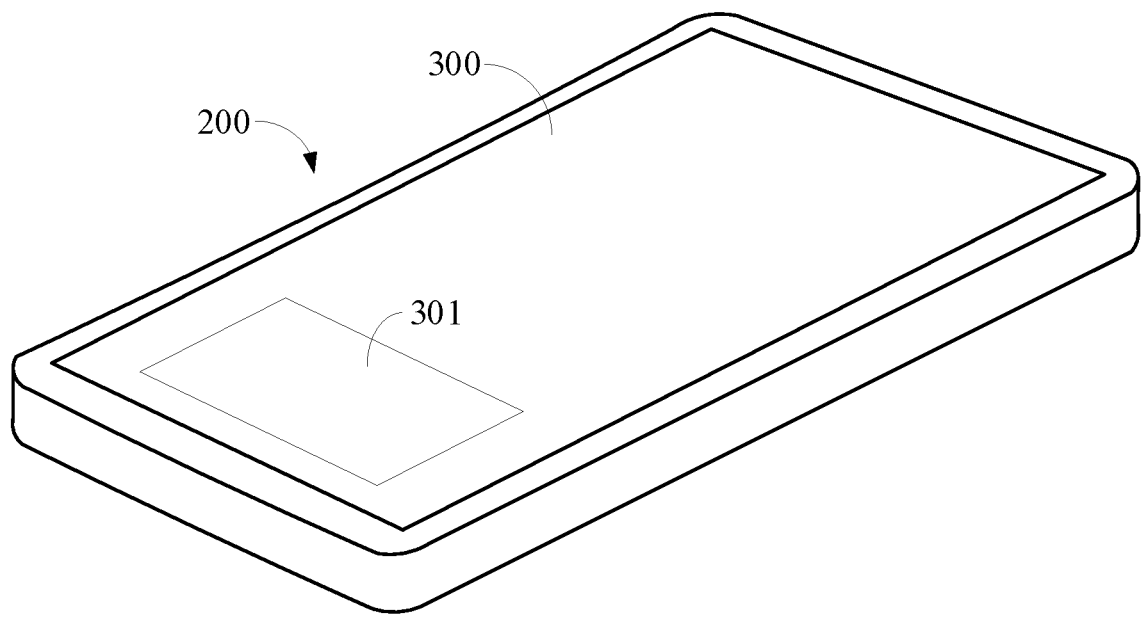
FIG. 4 is a schematic diagram illustrating a structure of an electronic device according to some embodiments of the present disclosure.
Figure 5:
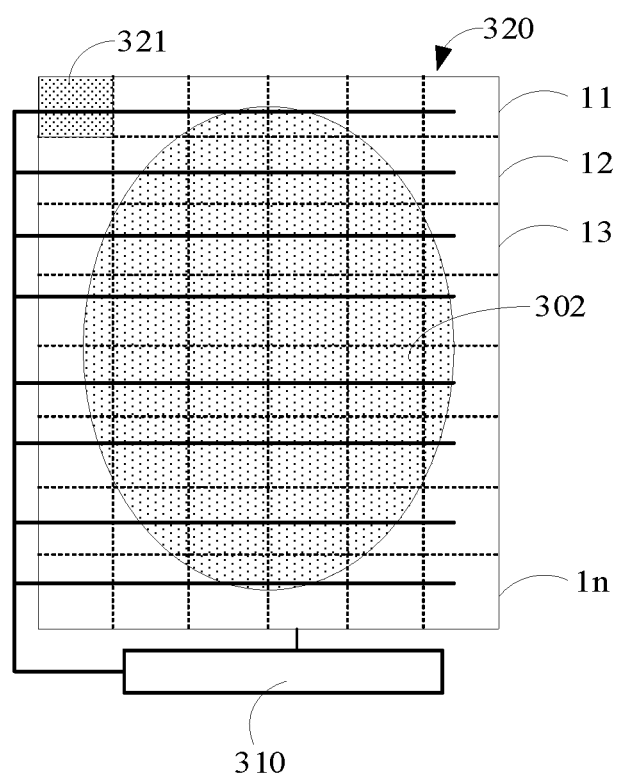
FIG. 5 is a schematic diagram illustrating a partial structure of a display panel according to some embodiments of the present disclosure.

FIG. 4 is a schematic diagram illustrating a structure of an electronic device according to some embodiments of the present disclosure. FIG. 5 is a schematic diagram illustrating a partial structure of a display panel according to some embodiments of the present disclosure. In the embodiments of the present disclosure, the electronic device 200 includes, but is not limited to, a smart device such as a mobile phone, a tablet computer, an iPad, a digital broadcasting terminal, a messaging device, a game console, a medical device, a fitness device, a personal digital assistant, and the like. As illustrated in FIG. 4 and FIG. 5, the electronic device 200 includes a display panel 300. The display panel 300 includes a control module 310 and an active pixel sensor array 320. The active pixel sensor array 320 is connected to the control module 310. In some embodiments, the display panel 300 includes a fingerprint detection area 301, and the active pixel sensor array 320 is placed in the fingerprint detection area 301. Specifically, the active pixel sensor array 320 may be formed below the fingerprint detection area 301, to realize the below-screen fingerprint technology.

Figure 6:
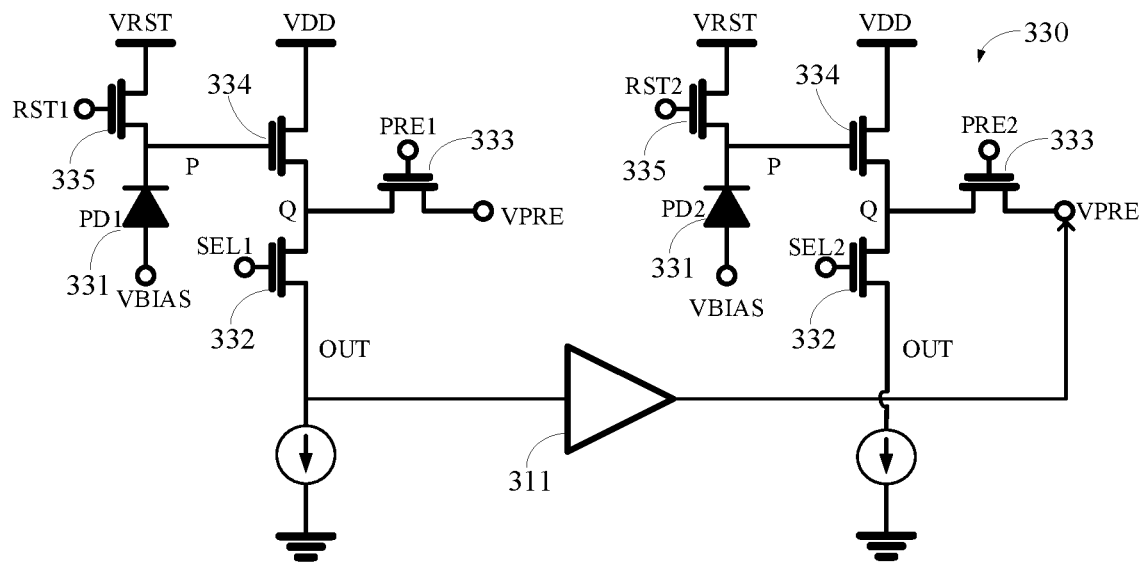
FIG. 6 is a schematic diagram illustrating connection of two pixel circuits located in two adjacent rows according to some embodiments of the present disclosure.

The active pixel sensor array 320 includes a plurality of pixel circuits 330 (as illustrated in FIG. 6), the plurality of pixel circuits 330 are arranged in a multi-row layout. As illustrated in FIG. 5, the active pixel sensor array 320 includes a plurality of pixels 321 arranged in a multi-row layout, and each pixel circuit 330 may be formed in one pixel 321. In order to prevent the pixel circuit 330 from additionally occupying a light-emitting interval, the pixel circuit 330 may be located in a black matrix area of the pixel 321. In some embodiments, the plurality of pixel circuits 330 are arranged in a multi-row and multi-column layout. In other embodiments, the plurality of pixel circuits 330 are arranged in a multi-row and one-column layout. The structure of each pixel circuit 330 may be the same.

FIG. 6 is a schematic diagram illustrating connection of two pixel circuits 330 located in two adjacent rows according to some embodiments of the present disclosure. Taking the left pixel circuit as an example, the pixel circuit 330 includes a photoelectric conversion module 331, a signal output terminal OUT, a voltage control terminal VPRE, a gating module 332, and a pre-discharging module 333.

The photoelectric conversion module 331 may include a photodiode, while the photodiode is configured to convert an optical signal into an electrical signal. The signal output terminal OUT is configured to output a voltage signal at the point Q to the control module 310.

The gating module 332 is connected to the photoelectric conversion module 331 and the signal output terminal OUT. The gating module 332 also is connected to the control module 310, and the control module 310 controls the gating module 332 to be turned on or turned off.

The pre-discharging module 333 includes a first end and a second end. The first end is configured to connect between the photoelectric conversion module 331 and the gating module 332, and the second end is configured to connect to the voltage control terminal VPRE. The pre-discharging module 333 is further connected to the control module 310, and the control module 310 controls the pre-discharging module 333 to be turned on or turned off. The voltage signal outputted to the signal output terminal OUT by the gating module 332, that is, the voltage at the point Q, may be adjusted in advance through the pre-discharging module 333, such that a time period during which the voltage falls from the high voltage state back to the stable state may be shortened, and thereby facilitating to improve the readout efficiency of the voltage signal.

Further, in some embodiments, with reference to FIG. 6, the pixel circuit 330 further includes a source follower 334 and a first voltage terminal VDD. The source follower 334 includes a third end, a fourth end, and a fifth end. The third end is configured to connect between the gating module 332 and the pre-discharging module 333, the fourth end is configured to connect to the first voltage terminal VDD, and the fifth end is configured to connect to the photoelectric conversion module 331. The voltage signal at the point P conversed photoelectrically by the photoelectric conversion module 331 may be determined according to a preset relationship between the voltage at the point P which is between the source follower 334 and the photoelectric conversion module 331 and the voltage at the point Q which is between the source follower 334 and the gating module 332, and the voltage at the point Q outputted from the signal output terminal OUT. The voltage at the point P may be indirectly characterized by the voltage at the point Q.

Further, in some embodiments, the pixel circuit 300 further includes a reset module 335 and a second voltage terminal VRST. The reset module 335 is configured to connect to the photoelectric conversion module 331 and the control module 310, and the reset module 335 is also configured to connect to the second voltage terminal VRST. The control module 310 is further configured to control the reset module 335 to reset the photoelectric conversion module 331 after the pre-discharging module 333 is turned on.

In embodiments of the present disclosure, the gating module 332, the pre-discharging module 333, the source follower 334, and the reset module 335 may all be formed on a glass substrate, and may be Thin-Film Transistor (TFT).

In embodiments of the present disclosure, when the plurality of pixel circuits are arranged in a multi-row and multi-column layout, the voltage control terminals VPRE of the pixel circuits 330 in the same row may be connected to a same control line, the first voltage terminals VDD of the pixel circuits 330 in the same row may be connected to the same control line, and the second voltage terminals VRST of the pixel circuits 330 in the same row may be connected to the same control line. In this way, not only the pixel circuits 330 in the same row can be controlled to work simultaneously, but also it is advantageous to simplify wiring layout. Furthermore, the gating modules 332 of the pixel circuits 330 in the same row may be connected to the same control line, the pre-discharging modules 333 of the pixel circuits 330 in the same row may be connected to the same control line, and the reset modules 335 of the pixel circuits 330 in the same row may be connected to the same control line, thus facilitating the control module 310 to simultaneously control the gating modules 332, the pre-discharging modules 333, and the reset modules 335 of the pixel circuits 330 in the same row to be turned on or off.

The control module 310 is configured to control the gating module 332 in a current row to turn on, to read a voltage signal outputted from the signal output terminal OUT in the current row, to generate a reference voltage signal according to the voltage signal, and to output the reference voltage signal to the voltage control terminal VPRE in a next row and control the pre-discharging module 333 in the next row to turn on before the gating module 332 in the next row is turned on.

For convenience of description, with reference to FIG. 5, according to working time sequence, the pixel circuits 330 in the multiple rows are sequentially referred to as a first row pixel circuit 11, a second row pixel circuit 12, a third row pixel circuit 13, . . . , an n-th row pixel circuit 1n. Based on different cover areas of the fingerprint 302 on the pixel circuits in different rows and the valley and ridge structure of the fingerprint, the optical signals accumulated by the photoelectric conversion modules 331 of the pixel circuits 330 in different rows are different, that is, the voltage signal outputted from the output terminal OUT in the first row pixel circuit 11, the voltage signal outputted from the signal output terminal OUT in the second row pixel circuit 12, ..., and the voltage signal outputted from the signal output terminal OUT in the nth row pixel circuit 1n are different. However, since a shape of the fingerprint is similar to an ellipse, the optical signals accumulated by the photoelectric conversion modules 331 of the pixel circuits 330 in adjacent two rows are close on volume, and the outputted voltage signals are close.

With reference to FIG. 6, taking the left pixel circuit as one pixel circuit 330 in the first row pixel circuit 11 and the right pixel circuit as one pixel circuit 330 in the second row pixel circuit 12 as an example, the control module 310 reads the voltage signal outputted from the signal output terminal OUT of the left pixel circuit and generates the reference voltage signal, and then inputs the reference voltage signal to the voltage control terminal VPRE of the right pixel circuit. Since the optical signal collected by the photoelectric conversion module PD1 in the first row pixel circuit 11 is close to the optical signal collected by the photoelectric conversion module PD2 in the second row pixel circuit 12, the voltage signal reflected to the point Q by the optical signal collected by the photoelectric conversion module PD1 and the resulting reference voltage signal are close to the voltage signal reflected to the point Q by the optical signal collected by the photoelectric conversion module PD2 in the next row. Therefore, it is easy to quickly stabilize the voltage at the point Q in the right pixel circuit by using the reference voltage signal in the current row as the input signal of the voltage control terminal VPRE in the next row, so as to reduce the coupling noise.

In the display panel provided by embodiments of the present disclosure, the voltage signal outputted to the signal output terminal OUT by the gating module 332 may be adjusted in advance through the pre-discharging module 333, such that a time period during which the voltage signal falls from a high voltage state back to a stable state is shortened, thus facilitating to improve the readout efficiency of the voltage signal. When detecting the fingerprint, since optical signals accumulated by the photoelectric conversion modules 331 in different rows are different, the voltage signals of the pixel circuits 330 in different rows read by the control module 310 may be different. By reading the voltage signal outputted from the signal output terminal OUT of the pixel circuit 330 in the current row and generating the reference voltage signal based on the voltage signal, and then outputting the reference voltage signal to the voltage control terminal VPRE in the next row, the reference voltage signal inputted to the voltage control terminal VPRE in the next row may be adjusted based on the optical signal accumulated by the photoelectric conversion module 331 in the current row, so as to quickly and stably adjust the voltage signal outputted to the signal output terminal OUT by the gating module 332 through the reference voltage signal, which facilitates to reduce coupling noise and improve the readout efficiency of the voltage signal compared to inputting the same voltage signal to the voltage control terminal VPRE.

In some embodiments, the pixel circuits 330 are arranged in a multi-row and multi-column layout, the control module 310 is further configured to read voltage signals outputted from the signal output terminals OUT of at least two columns of the pixel circuits 330 in the current row, and determine an average voltage signal of the voltage signals of the at least two columns of the pixel circuits 330 as the reference voltage signal. In some embodiments, the voltage control terminals VPRE of the pixel circuits 330 in the same row may be connected to the same control line, and the pixel circuits 330 in the same column may be connected to the same signal output terminal OUT. By obtaining the average voltage signal of the voltage signals outputted from the signal output terminal OUT of at least two columns of the pixel circuits 330 in the current row, and inputting the average voltage signal to the voltage control terminals VPRE of the pixel circuits 330 in the next row, it not only helps to reduce the coupling noise caused by a voltage difference, but also to simplify the wiring layout and facilitate the control module 310 to control the pixel circuits 330 to work.

In some other embodiments, the pixel circuits 330 are arranged in a multi-row and one-column layout. The control module 310 is further configured to read the voltage signal outputted from the signal output terminal OUT of the pixel circuit 330 in the current row as the reference voltage signal.

In some embodiments, the control module 310 is further configured to read an effective voltage signal outputted from the signal output terminal OUT of the pixel circuit 330 in the current row, and generate the reference voltage signal according to the effective voltage signal. The effective voltage signal is a voltage signal greater than a voltage signal threshold. It should be noted that the "effective voltage signal" refers to a voltage signal outputted by the pixel circuit 330 in a finger-pressed area. When detecting the fingerprint, the voltage signal reflected to the point Q by the optical signal accumulated by the photoelectric conversion module 331 of the pixel circuit 330 in the finger-pressed area may be large, while the photoelectric conversion module 331 of the pixel circuit 330 in the area where the finger is not pressed does not accumulate the optical signal, which reflects the smaller voltage signal to the point Q. The control module 310 determines whether the voltage signal is an effective voltage signal by comparing the voltage signal outputted by the pixel circuit 330 with the voltage signal threshold. In some embodiments, the effective voltage signal outputted from the signal output terminal OUT of the pixel circuit 330 in the current row is read, and the reference voltage signal is generated and then inputted to the voltage control terminal VPRE of the pixel circuit 330 in the next row. Since the optical signals accumulated by the photoelectric conversion modules 331 of the pixel circuits 330 in two adjacent rows are close on volume, the reference voltage signal is closer to the voltage signal at the point Q of the pixel circuit 330 in the next row, compared to taking the average voltage signal of the voltage signals outputted from the at least two columns of the pixel circuits 330 in the current row as the reference voltage signal. In this way, the voltage at the point Q may be quickly stabilized, thereby reducing the coupling noise, and improving the readout efficiency of the voltage signal.

Further, in some embodiments, when the finger presses the at least two columns of the pixel circuits 330, the control module 310 is configured to, read the effective voltage signals outputted from the signal output terminals OUT of at least two columns of the pixel circuits 330 in the current row, and determine the average voltage signal of the effective voltage signals of the at least two columns of the pixel circuits 330 as the reference voltage signal. In some other embodiments, when the finger presses one column of the pixel circuit 330, the control module 310 is configured to, read the effective voltage signal outputted from the signal output terminal OUT of the column of the pixel circuit 330 in the current row as the reference voltage signal.

In some embodiments, with reference to FIG. 6, the control module 310 includes a buffer 311, the buffer 311 includes a buffer input terminal and a buffer output terminal, the buffer 311 is configured to receive the reference voltage signal through the buffer input terminal, buffer the reference voltage signal, and output the reference voltage signal to the voltage control terminal VPRE in the next row through the buffer output terminal. With buffering the reference voltage signal through the buffer 311, it is convenient for the control module 310 to control the time when the reference voltage signal is input to the voltage control terminal VPRE in the next row. Exemplarily, the buffer 311 is integrated in a chip of the control module 310.

Figure 7:
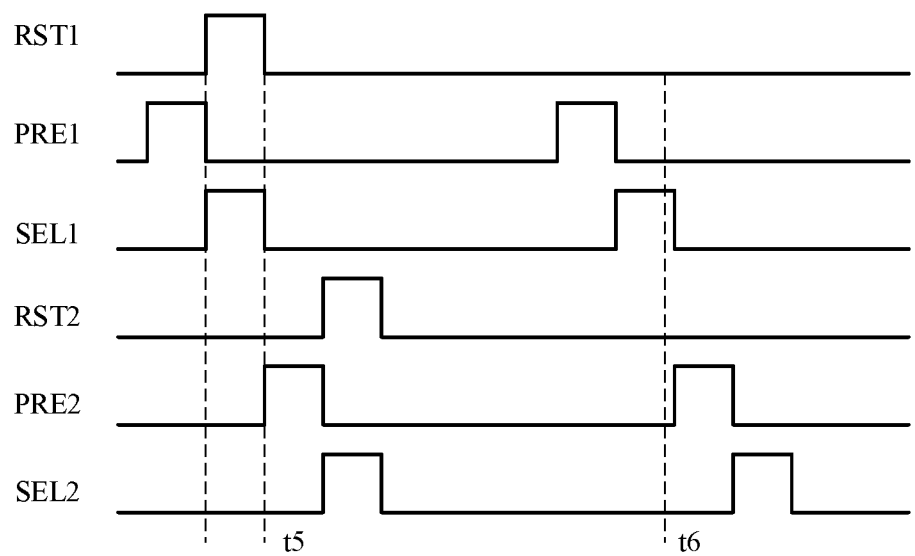
FIG. 7 is a schematic diagram illustrating a working timing sequence of a first row pixel circuit and a second row according to some embodiments of the present disclosure.

FIG. 7 is a chart illustrating working timing sequence of a first row pixel circuit 11 and a second row pixel circuit 12 according to some embodiments of the present disclosure. In FIG. 7, when a pulse signal is at a high level, the reset module RST1, the pre-discharging module PRE1, and the gating module SEL1 of the first row pixel circuits 11, the reset module RST2, the pre-discharging module PRE2, and the gating module SEL2 of the second row pixel circuits 12 are turned on. When the pulse signal is at a low level, the reset module RST1, the pre-discharging module PRE1, and the gating module SEL1 of the first row pixel circuits 11, the reset module RST2, the pre-discharging module PRE2, and the gating module SEL2 of the second row pixel circuits 12 are turned off.

In some embodiments, the control module 310 is further configured to, control a turn-on time of the gating module 332 to be the same as a turn-off time of the pre-discharging module 333 of the pixel circuit 330 in the same row. With reference to FIG. 7, the pre-discharging module 333 stabilizes the voltage signal at the point Q, and then turns off, at the same time the gating module 332 turns on, and the control module 310 reads the voltage signal outputted by the gating module 332 to the signal output terminal OUT. Thus, by making full use of time to control the gating module 332 and the pre-discharging module 333 of the pixel circuit 330 in the same row to work, it is beneficial to improve the readout efficiency of the voltage signal.

In some embodiments, the control module 310 is further configured to, control a turn-off time of the gating module 332 in the current row to be the same as a turn-on time of the pre-discharging module 333 in the next row. With reference to FIG. 7, after reading the voltage signal outputted by the gating module 332 in the current row to the signal output terminal OUT, the reference voltage signal is generated, the gating module 332 in the current row is turned off, at the same time the pre-discharging module 333 in the next row is turned on, and the reference voltage signal is inputted to the voltage control terminal VPRE in the next row. Thus, by making full use of time to control the pixel circuits 330 in two adjacent rows to work, it is beneficial to improve the readout efficiency of the voltage signal.

In order to more clearly understand the working principle of the display panel 300, description is performed as follows with reference to FIG. 6 and FIG. 7.

When the finger presses the fingerprint detection area 301, the control module 310 controls the active pixel sensor array 320 to work, and the pixel circuits in the non-fingerprint detection area do not participate in the fingerprint detection.

First, the control module 310 inputs a preset voltage signal to the voltage control terminal VPRE of the pre-discharging module PRE1 of the first row pixel circuit 11, and at the same time controls the pre-discharging module PRE1 to turn on, so as to pull down and stabilize the voltage at the point Q of each pixel circuit 330 in the first row pixel circuit 11. Then, the control module 310 controls the pre-discharging module PRE1 in the first row pixel circuit 11 to turn off, the reset module RST1 and the gating module SEL1 to turn on, the reset module RST1 resets the photoelectric conversion module PD1, and the control module 310 reads the voltage signal of the first row pixel circuit 11 through the signal output terminal OUT, and also generates the reference voltage signal.

Next, the control module 310 controls the gating module SEL1 and the reset module RST1 in the first row pixel circuits 11 to be turned off. The control module 310 inputs the reference voltage signal to the voltage control terminal VPRE of the pre-discharging module PRE2 in the second row pixel circuits 12, and controls the pre-discharging module PRE2 to turn on, so as to pull down and stabilize the voltage at the point Q of each pixel circuit 330 in the second row pixel circuit 12. Then, the control module 310 controls the pre-discharging module PRE2 in the second row pixel circuit 12 to turn off, the reset module RST2 and the gating module SEL2 to turn on, the reset module RST2 resets the photoelectric conversion module PD2, and the control module 310 reads the voltage signal of the second row pixel circuit 12 through the signal output terminal OUT, and generates the new reference voltage signal, for inputting to the third row pixel circuit 13.

When detecting the fingerprint, taking the first row pixel circuit 11 as an example, before time t5, after the gating module SEL1 turns on, the photoelectric conversion module PD1 does not accumulate the optical signal, but the control module 310 still performs the above step of reading the voltage signal outputted from the signal output terminal OUT of the first row pixel circuit 11, and generating the reference voltage signal. After the reset module RST1 resets the photoelectric conversion module PD1, the photoelectric conversion module PD1 accumulates the optical signal and converts the optical signal into the electrical signal during the time period from t5 to t6. And at time t6, the control module 310 reads the voltage signal outputted from the signal output terminal OUT of the first row pixel circuit 11, and generates the reference voltage signal.

Some embodiments of the present disclosure also provide a control method of a display panel. The control method is configured to control the display panel, the display panel includes an active pixel sensor array, the active pixel sensor array includes a plurality of pixel circuits arranged in a multi-row layout. The pixel circuit includes a photoelectric conversion module, a signal output terminal, a voltage control terminal, a gating module connected to the photoelectric conversion module and the signal output terminal, and a pre-discharging module. The pre-discharging module includes a first end and a second end, the first end is connected between the photoelectric conversion module and the gating module, and the second end is connected to the voltage control terminal.

Figure 8:
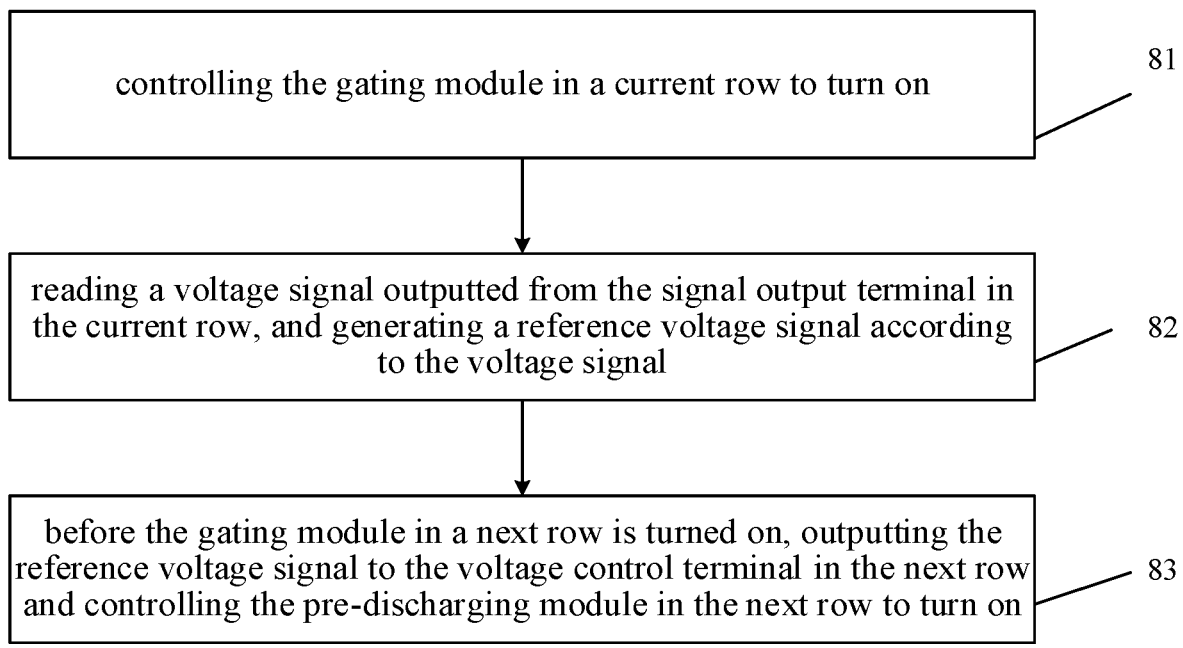
FIG. 8 is a flowchart illustrating a control method of a display panel according to some embodiments of the present disclosure.

FIG. 8 is a flowchart illustrating a control method of a display panel according to some embodiments of the present disclosure. The control method includes acts in the following blocks.

At block 81, the gating module in a current row is controlled to turn on.

Specifically, the gating modules of the pixel circuits in the same row are connected to a same control line, so as to be able to be turned on simultaneously.

At block 82, a voltage signal outputted from the signal output terminal in the current row is read, and a reference voltage signal is generated according to the voltage signal.

In some embodiments, the pixel circuits are arranged in a multi-row and multi-column layout, the act at block 82 includes but is not limit to acts in the following blocks.

At block 821, voltage signals outputted from the signal output terminals of at least two columns of the pixel circuits in the current row are read.

Specifically, when the pixel circuits are arranged in a multi-row and multi-column layout, the voltage signals of at least two columns of the pixel circuits in the current row may be read, the voltage signals of all columns of the pixel circuits in the current row may also be read.

At block 822, an average voltage signal of the voltage signals of the at least two columns of the pixel circuits is determined as the reference voltage signal.

In some other embodiments, the pixel circuits are arranged in a multi-row and one-column layout, the voltage signal outputted from the signal output terminal in the current row is read as the reference voltage signal.

In some embodiments, reading the voltage signal outputted from the signal output terminal in the current row and generating the reference voltage signal according to the voltage signal, includes: reading an effective voltage signal outputted from the signal output terminal of the pixel circuit in the current row, and generating the reference voltage signal according to the effective voltage signal. The effective voltage signal is a voltage signal greater than a voltage signal threshold.

In some embodiments, after the block 82, the control method further includes: buffering the reference voltage signal. Specifically, the reference voltage signal may be buffered through a buffer.

At block 83, before the gating module in a next row is turned on, the reference voltage signal is outputted to the voltage control terminal in the next row and the pre-discharging module in the next row is controlled to turn on.

In some embodiments, the control method further includes: controlling a turn-on time of the gating module to be the same as a turn-off time of the pre-discharging module of the pixel circuit in the same row; and/or, controlling a turn-off time of the gating module in the current row to be the same as a turn-on time of the pre-discharging module in the next row.

So far, according to the control method of the display panel provided by the embodiments of the present disclosure, the voltage signal outputted to the signal output terminal by the gating module may be adjusted in advance through the pre-discharging module, such that a time period during which the voltage signal falls from a high voltage state back to a stable state may be shortened, thus facilitating to improve a readout efficiency of the voltage signal. When detecting fingerprint, since optical signals accumulated by the photoelectric conversion modules in different rows are different, the voltage signals read by the control module from the pixel circuits in different rows may be different. By reading the voltage signal outputted from the signal output terminal of the pixel circuit in the current row and generating the reference voltage signal based on the voltage signal, and then outputting the reference voltage signal to the voltage control terminal in the next row, the reference voltage signal inputted to the voltage control terminal in the next row may be adjusted based on the optical signal accumulated by the photoelectric conversion module in the current row, so as to quickly and stably adjust the voltage signal outputted to the signal output terminal by the gating module through the reference voltage signal, which facilitates to reduce coupling noise and improve the readout efficiency of the voltage signal compared to inputting the same voltage signal to the voltage control terminal.

Some embodiments of the present disclosure also provide a control apparatus of a display panel. The control apparatus of the display panel is configured to control the display panel. The display panel includes an active pixel sensor array. The active pixel sensor array includes a plurality of pixel circuits arranged in a multi-row layout. The pixel circuit includes a photoelectric conversion module, a signal output terminal, a voltage control terminal, a gating module connected to the photoelectric conversion module and the signal output terminal, and a pre-discharging module. The pre-discharging module includes a first end and a second end, the first end is connected between the photoelectric conversion module and the gating module, and the second end is connected to the voltage control terminal.

Figure 9:
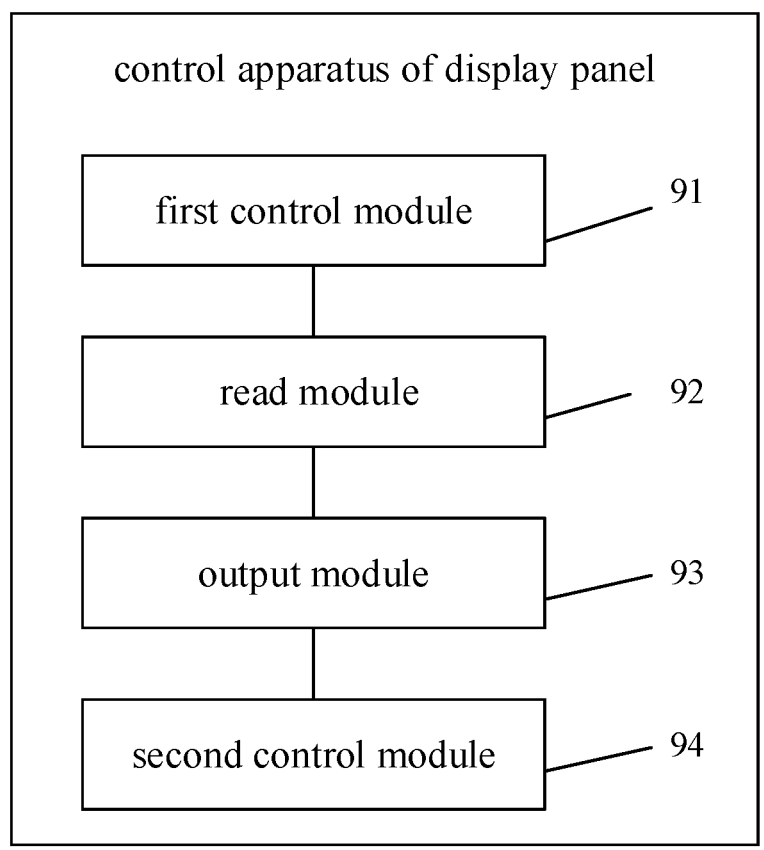
FIG. 9 is a block diagram of a control apparatus of a display panel according to some embodiments of the present disclosure.

FIG. 9 is a block diagram of a control apparatus of a display panel according to some embodiments of the present disclosure. The control apparatus includes a first control module 91, a read module 92, an output module 93, and a second control module 94.

The first control module 91 is configured to control the gating module in a current row to turn on. The read module 92 is configured to read a voltage signal outputted from the signal output terminal in the current row, and generate a reference voltage signal according to the voltage signal. The output module 93 is configured to output the reference voltage signal to the voltage control terminal in a next row before the gating module in the next row is turned on. And the second control module 94 is configured to control the pre-discharging module in the next row to turn on.

In some embodiments, the pixel circuits are arranged in a multi-row and multi-column layout, the read module 92 includes a read unit and a determine unit. The read unit is configured to read voltage signals outputted from the signal output terminals of at least two columns of the pixel circuits in the current row. And the determine unit is configured to determine an average voltage signal of the voltage signals of the at least two columns of the pixel circuits as the reference voltage signal.

In some embodiments, the read module 92 is configured to, read an effective voltage signal outputted from the signal output terminal of the pixel circuit in the current row, and generate the reference voltage signal according to the effective voltage signal, the effective voltage signal is a voltage signal greater than a voltage signal threshold.

In some embodiments, the control apparatus further includes a buffer, the buffer is configured to receive the reference voltage signal.

In some embodiments, the control apparatus further includes a third control module and/or a fourth control module. The third control module is configured to control a turn-on time of the gating module to be the same as a turn-off time of the pre-discharging module of the pixel circuit in the same row. The fourth control module is configured to, control a turn-off time of the gating module in the current row to be the same as a turn-on time of the pre-discharging module in the next row.

So far, according to the control apparatus of the display panel provided by the embodiments of the present disclosure, the voltage signal outputted to the signal output terminal by the gating module may be adjusted in advance through the pre-discharging module, such that a time period during which the voltage signal falls from a high voltage state back to a stable state, thus facilitating to improve a readout efficiency of the voltage signal. When detecting fingerprint, since optical signals accumulated by the photoelectric conversion modules in different rows are different, the voltage signals of the pixel circuits in different rows read by the control module may be different. By reading the voltage signal outputted from the signal output terminal of the pixel circuit in the current row through the read module 92 and generating the reference voltage signal based on the voltage signal, and then outputting the reference voltage signal to the voltage control terminal in the next row through the output module 93, the reference voltage signal inputted to the voltage control terminal in the next row may be adjusted based on the optical signals accumulated by the photoelectric conversion module in the current row, so as to quickly and stably adjust the voltage signal outputted to the signal output terminal by the gating module through the reference voltage signal, which facilitates to reduce coupling noise and improve the readout efficiency of the voltage signal compared to inputting the same voltage signal to the voltage control terminal.

Figure 10:
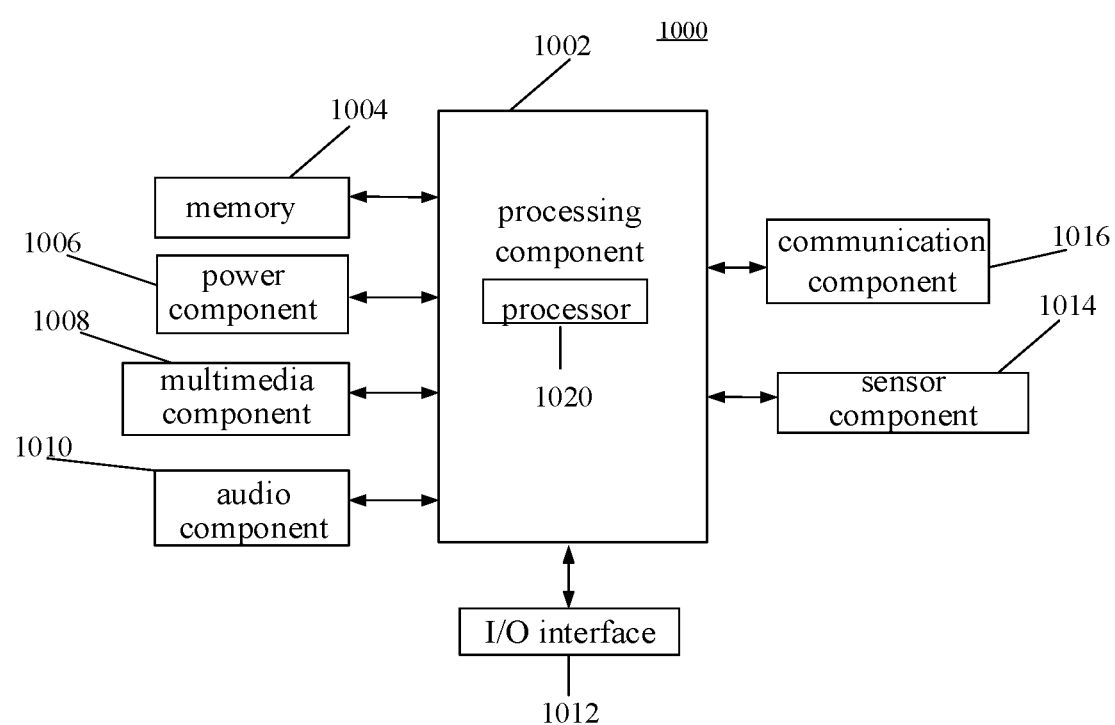
FIG. 10 is a block diagram of an electronic device according to some embodiments of the present disclosure.

FIG. 10 is a block diagram of an electronic device according to some embodiments of the present disclosure. For example, the electronic device 1000 may be a smartphone, a computer, a digital broadcasting terminal, a tablet device, a medical device, a fitness device, a personal digital assistant, etc. containing a transmitting coil for adjusting audio parameters of a headset, a first magnetic sensor and a second magnetic sensor.

As illustrated in FIG. 10, the electronic device 1000 may include one or more of the following components: a processing component 1002, a memory 1004, a power component 1006, a multimedia component 1008, an audio component 1010, an input/output (I/O) interface 1012, a sensor component 1014, and a communication component 1016.

The processing component 1002 typically controls overall operations of the electronic device 1000, such as the operations associated with display, telephone calls, data communications, camera operations, and recording operations. The processing component 1002 may include one or more processors 1020 to execute instructions. Moreover, the processing component 1002 may include one or more modules which facilitate the interaction between the processing component 1002 and other components. For instance, the processing component 1002 may include a multimedia module to facilitate the interaction between the multimedia component 1008 and the processing component 1002.

The memory 1004 is configured to store various types of data to support the operation of the electronic device 1000. Examples of such data include instructions for any applications or methods operated on the electronic device 1000, contact data, phonebook data, messages, pictures, video, etc. The memory 1004 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1006 provides power to various components of the electronic device 1000. The power component 1006 may include a power management system, one or more power sources, and any other components associated with the generation, management, and distribution of power in the electronic device 1000.

The multimedia component 1008 includes a screen providing an output interface between the electronic device 1000 and the user. In some embodiments, the screen may include a liquid crystal display (LCD) and a touch panel (TP). In some embodiments, an organic light-emitting diode (OLED) display or other types of displays can be employed.

If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action.

The audio component 1010 is configured to output and/or input audio signals. For example, the audio component 1010 includes a microphone ("MIC") configured to receive an external audio signal when the electronic device 1000 is in an operation mode, such as a call mode, a recording mode, and a voice recognition mode. The received audio signal may be further stored in the memory 1004 or transmitted via the communication component 1016.

The I/O interface 1012 provides an interface between the processing component 1002 and peripheral interface modules, such as a keyboard, a click wheel, buttons, and the like.

The sensor component 1014 includes one or more sensors to provide status assessments of various aspects of the electronic device 1000. For instance, the sensor component 614 may detect an open/closed status of the electronic device 1000, relative positioning of components, e.g., the display and the keypad, of the electronic device 1000, a change in position of the electronic device 1000 or a component of the electronic device 1000, a presence or absence of a target object contact with the electronic device 1000, an orientation or an acceleration/deceleration of the electronic device 1000, and a change in temperature of the electronic device 1000.

The communication component 1016 is configured to facilitate communication, wired or wirelessly, between the electronic device 1000 and other devices. The electronic device 1000 can access a wireless network based on a communication standard, such as WiFi, 2G, 3G, 4G, 5G, or a combination thereof. In one exemplary embodiment, the communication component 1016 receives a broadcast signal or broadcast associated information from an external broadcast management system via a broadcast channel. In one exemplary embodiment, the communication component 1016 further includes a near field communication (NFC) module to facilitate short-range communications. For example, the NFC module may be implemented based on a radio frequency identity (RFID) technology, an infrared data association (IrDA) technology, an ultra-wideband (UWB) technology, a Bluetooth (BT) technology, and other technologies.

In some embodiments, the electronic device 1000 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components.

In some embodiments, there is also provided a non-transitory computer-readable storage medium having a program stored thereon, when the program is executed by a processor 1020, any control method of display panel mentioned above is implemented. For example, the readable storage medium may be a ROM, a RAM, a CD-ROM, a magnetic tape, a floppy disc, an optical data storage device, and the like.

The method embodiments may substantially correspond to the apparatus embodiments, and various steps thereof can be referred to the description of the apparatus embodiments. The method embodiments and the apparatus embodiments can complement each other.

The above each embodiment of the present disclosure can complement each other without conflict.

Various embodiments of the present disclosure can have one or more of the following advantages.

The voltage signal outputted to the signal output terminal by the gating module can be adjusted in advance through the pre-discharging module, such that a time period during which the voltage signal falls from a high voltage state back to a stable state may be shortened, thus facilitating to improve readout efficiency of the voltage signal. When detecting fingerprint, since optical signals accumulated by the photoelectric conversion modules in different rows are different, the voltage signals read by the control module from different rows may be different. By reading the voltage signal outputted from the signal output terminal in the current row and generating the reference voltage signal based on the voltage signal, and then outputting the reference voltage signal to the voltage control terminal in the next row, the reference voltage signal inputted to the voltage control terminal in the next row may be adjusted based on the optical signal accumulated by the photoelectric conversion module in the current row, so as to quickly and stably adjust the voltage signal outputted to the signal output terminal by the gating module through the reference voltage signal, which facilitates reducing coupling noise and improve the readout efficiency of the voltage signal compared to inputting the same voltage signal to the voltage control terminal.

The above are only preferred embodiments of the present disclosure, but are not intended to limit the present disclosure. Any modification, equivalent replacement, improvement, etc. made within the spirit and principle of the present disclosure should be included within the scope of protection of the present disclosure.

The various device components, modules, units, blocks, or portions may have modular configurations, or are composed of discrete components, but nonetheless can be referred to as "modules" in general. In other words, the "components," "modules," "blocks," "portions," or "units" referred to herein may or may not be in modular forms, and these phrases may be interchangeably used.

In the present disclosure, the terms "installed," "connected," "coupled," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or app can be provided in a form of a non-transitory computer-readable storage medium having instructions stored thereon is further provided. For example, the non-transitory computer-readable storage medium can be a ROM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

It should be understood that "a plurality" or "multiple" as referred to herein means two or more. "And/or," describing the association relationship of the associated objects, indicates that there may be three relationships, for example, A and/or B may indicate that there are three cases where A exists separately, A and B exist at the same time, and B exists separately. The character "/" generally indicates that the contextual objects are in an "or" relationship.

In the present disclosure, it is to be understood that the terms "lower," "upper," "under" or "beneath" or "underneath," "above," "front," "back," "left," "right," "top," "bottom," "inner," "outer," "horizontal," "vertical," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, a first element being "on" a second element may indicate direct contact between the first and second elements, without contact, or indirect geometrical relationship through one or more intermediate media or layers, unless otherwise explicitly stated and defined. Similarly, a first element being "under," "underneath" or "beneath" a second element may indicate direct contact between the first and second elements, without contact, or indirect geometrical relationship through one or more intermediate media or layers, unless otherwise explicitly stated and defined.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

What is claimed is:

1. A display panel, comprising:
   an active pixel sensor array, comprising a plurality of pixel circuits arranged in multiple rows, wherein each of the pixel circuit comprises, a photoelectric conversion module, a signal output terminal, a voltage control terminal, a gating module configured to connect to the photoelectric conversion module and the signal output terminal, and a pre-discharging module, comprising a first end and a second end, wherein the first end is configured to connect between the photoelectric conversion module and the gating module, and the second end is configured to connect to the voltage control terminal;
   a control module, connected to the active pixel sensor array, and configured to, control the gating module in a current row to turn on, read a voltage signal outputted from the signal output terminal in the current row, generate a reference voltage signal according to the voltage signal, before the gating module in a next row is turned on, output the reference voltage signal to the voltage control terminal in the next row and control the pre-discharging module in the next row to turn on.

2. The display panel according to claim 1, wherein the plurality of pixel circuits are arranged in multiple rows and multiple columns, the control module is further configured to read voltage signals outputted from the signal output terminals of at least two columns in the current row, and determine an average voltage signal of the voltage signals of the at least two columns in the current row as the reference voltage signal.

3. The display panel according to claim 1, wherein the control module is further configured to, read an effective voltage signal outputted from the signal output terminal in the current row, and generate the reference voltage signal according to the effective voltage signal, the effective voltage signal being a voltage signal greater than a voltage signal threshold.

4. The display panel according to claim 1, wherein the control module comprises a buffer, the buffer comprising a buffer input terminal and a buffer output terminal;
   wherein the buffer is configured to:
   receive the reference voltage signal through the buffer input terminal;
   buffer the reference voltage signal; and
   output the reference voltage signal to the voltage control terminal in the next row through the buffer output terminal.

5. The display panel according to claim 1, wherein the control module is further configured to, control a turn-on time of the gating module to be the same as a turn-off time of the pre-discharging module in the same row.

6. The display panel according to claim 1, wherein the control module is further configured to, control a turn-off time of the gating module in the current row to be the same as a turn-on time of the pre-discharging module in the next row.

7. The display panel according to claim 1, wherein the pixel circuit further comprises: a source follower and a first voltage terminal, the source follower comprising a third end, a fourth end and a fifth end, wherein the third end is configured to connect between the gating module and the pre-discharging module, the fourth end is configured to connect to the first voltage terminal, and the fifth end is configured to connect to the photoelectric conversion module.

8. The display panel according to claim 1, wherein the pixel circuit further comprises: a reset module configured to connect to the photoelectric conversion module and the control module; wherein the control module is further configured to control the reset module to reset the photoelectric conversion module after the pre-discharging module is turned on.

9. The display panel according to claim 1, wherein the display panel comprises a fingerprint detection area, wherein the active pixel sensor array is placed in the fingerprint detection area.

10. An apparatus comprising the display panel of claim 1, wherein
    the voltage signal outputted to the signal output terminal by the gating module is adjusted in advance through the pre-discharging module, such that a time period during which the voltage signal falls from a high voltage state back to a stable state is shortened, thereby facilitating improved readout efficiency of the voltage signal;

the display panel comprises a fingerprint detection area, and when detecting fingerprint, optical signals accumulated by the photoelectric conversion modules in different rows are different, the voltage signals read by the control module from different rows are different; by reading the voltage signal outputted from the signal output terminal in the current row and generating the reference voltage signal based on the voltage signal, and then outputting the reference voltage signal to the voltage control terminal in a next row, the reference voltage signal inputted to the voltage control terminal in the next row is adjusted based on the optical signal accumulated by the photoelectric conversion module in the current row, to improve speed and stability in adjusting the voltage signal outputted to the signal output terminal by the gating module through the reference voltage signal, thereby reducing coupling noise and improving the readout efficiency of the voltage signal.

11. A control method of a display panel, configuring to control the display panel, the display panel comprising an active pixel sensor array, the active pixel sensor array comprising a plurality of pixel circuits arranged in a multi-row layout, the pixel circuit comprising a photoelectric conversion module, a signal output terminal, a voltage control terminal, a gating module connected to the photoelectric conversion module and the signal output terminal, and a pre-discharging module, the pre-discharging module comprising a first end and a second end, wherein the first end is connected between the photoelectric conversion module and the gating module, and the second end is connected to the voltage control terminal;

wherein the control method comprises:
controlling the gating module in a current row to turn on;
reading a voltage signal outputted from the signal output terminal in the current row;
generating a reference voltage signal according to the voltage signal; and
before the gating module in a next row is turned on, outputting the reference voltage signal to the voltage control terminal in the next row and controlling the pre-discharging module in the next row to turn on.

12. The control method according to claim 11, after reading the voltage signal outputted from the signal output terminal in the current row and generating the reference voltage signal according to the voltage signal, the method further comprising:
buffering the reference voltage signal.

13. The control method according to claim 11, wherein, reading the voltage signal outputted from the signal output terminal in the current row and generating the reference voltage signal according to the voltage signal, comprises:
reading voltage signals outputted from the signal output terminals of at least two columns in the current row; and
determining an average voltage signal of the voltage signals of the at least two columns in the current row as the reference voltage signal.

14. The control method according to claim 11, wherein, reading the voltage signal outputted from the signal output terminal in the current row and generating the reference voltage signal according to the voltage signal, comprises:
reading an effective voltage signal outputted from the signal output terminal in the current row; and
generating the reference voltage signal according to the effective voltage signal;
wherein the effective voltage signal is a voltage signal greater than a voltage signal threshold.

15. The control method according to claim 11, further comprising:
controlling a turn-on time of the gating module to be the same as a turn-off time of the pre-discharging module in the same row; and/or,
controlling a turn-off time of the gating module in the current row to be the same as a turn-on time of the pre-discharging module in the next row.

16. A non-transitory computer-readable storage medium having a program stored thereon, when the program is executed by a processor, a control method of a display panel is implemented, wherein the control method is configured to control the display panel, the display panel comprising an active pixel sensor array, the active pixel sensor array comprising a plurality of pixel circuits arranged in a multi-row layout, the pixel circuit comprising a photoelectric conversion module, a signal output terminal, a voltage control terminal, a gating module connected to the photoelectric conversion module and the signal output terminal, and a pre-discharging module, the pre-discharging module comprising a first end and a second end, wherein the first end is connected between the photoelectric conversion module and the gating module, and the second end is connected to the voltage control terminal;

wherein the control method comprises:
controlling the gating module in a current row to turn on;
reading a voltage signal outputted from the signal output terminal in the current row;
generating a reference voltage signal according to the voltage signal; and
before the gating module in a next row is turned on, outputting the reference voltage signal to the voltage control terminal in the next row and controlling the pre-discharging module in the next row to turn on.

17. The storage medium according to claim 16, the method further comprising:
after reading the voltage signal outputted from the signal output terminal in the current row and generating the reference voltage signal according to the voltage signal, buffering the reference voltage signal.

18. The storage medium according to claim 16, wherein, reading the voltage signal outputted from the signal output terminal in the current row and generating the reference voltage signal according to the voltage signal, comprises:
reading voltage signals outputted from the signal output terminals of at least two columns in the current row; and
determining an average voltage signal of the voltage signals of the at least two columns in the current row as the reference voltage signal.

19. The storage medium according to claim 16, wherein, reading the voltage signal outputted from the signal output terminal in the current row and generating the reference voltage signal according to the voltage signal, comprises:
reading an effective voltage signal outputted from the signal output terminal in the current row; and
generating the reference voltage signal according to the effective voltage signal;

wherein the effective voltage signal is a voltage signal greater than a voltage signal threshold.

20. The storage medium according to claim 16, wherein the method further comprises:
controlling a turn-on time of the gating module to be the same as a turn-off time of the pre-discharging module in the same row; and/or,
controlling a turn-off time of the gating module in the current row to be the same as a turn-on time of the pre-discharging module in the next row.

* * * * *